United States Patent
Rao et al.

(10) Patent No.: US 12,474,517 B1
(45) Date of Patent: Nov. 18, 2025

(54) LIGHT GUIDE DEVICE, OPTICAL DISPLAY SYSTEM AND DISPLAY DEVICE

(71) Applicant: GOERTEK OPTICAL TECHNOLOGY CO., LTD., Shandong (CN)

(72) Inventors: Yi Rao, Weifang (CN); Lang Shen, Weifang (CN); Rudong Wei, Weifang (CN); Zhentao Fan, Weifang (CN); Xin Cheng, Weifang (CN); Chao Jiang, Weifang (CN); Xiao Wu, Weifang (CN)

(73) Assignee: GOERTEK OPTICAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 19/068,992

(22) Filed: Mar. 3, 2025

(30) Foreign Application Priority Data

Jun. 26, 2024 (CN) .......................... 202410833526.1

(51) Int. Cl.
*F21V 8/00* (2006.01)
*G02B 5/18* (2006.01)

(52) U.S. Cl.
CPC .......... *G02B 6/0016* (2013.01); *G02B 5/1823* (2013.01); *G02B 6/0036* (2013.01)

(58) Field of Classification Search
None
See application file for complete search history.

(56) References Cited

U.S. PATENT DOCUMENTS

| | | | | |
|---|---|---|---|---|
| 10,895,685 | B2* | 1/2021 | Huang | G02B 6/00 |
| 10,935,730 | B1* | 3/2021 | Lou | G02B 27/0172 |
| 10,962,787 | B1* | 3/2021 | Lou | G02B 6/0036 |
| 11,988,861 | B1* | 5/2024 | Fan | G02B 6/0016 |
| 2010/0214659 | A1* | 8/2010 | Levola | G02B 6/0035 359/566 |
| 2020/0264367 | A1* | 8/2020 | Huang | G02B 27/0081 |

(Continued)

FOREIGN PATENT DOCUMENTS

| | | |
|---|---|---|
| CN | 114815233 A | 7/2022 |
| CN | 217543544 U | 10/2022 |

(Continued)

OTHER PUBLICATIONS

First Office Action issued in Chinese Patent Application No. 202410833526.1; mailed Jul. 30, 2024; 10 pgs.

(Continued)

*Primary Examiner* — Jerry Rahll
(74) *Attorney, Agent, or Firm* — HAUPTMAN HAM, LLP

(57) ABSTRACT

Disclosed are a light guide device, an optical display system, and a display device. The light guide device includes a substrate and a first diffraction structure provided at the substrate. The first diffraction structure includes a first grating. The first grating includes a plurality of first grating units provided at intervals of a first period P1 along a first vector direction u1 and at intervals of a second period P2 along a second vector direction u2. The first vector direction u1 is intersected with the second vector direction u2, the first period P1 is longer than the second period P2, forming unequal periods in two vector directions, and the first period P1 is at least 1.5 times the second period P2.

8 Claims, 13 Drawing Sheets

(56) References Cited

U.S. PATENT DOCUMENTS

2022/0155511 A1* 5/2022 Park .................. G02B 27/42
2023/0333301 A1 10/2023 Song et al.
2024/0019698 A1 1/2024 Crosby et al.

FOREIGN PATENT DOCUMENTS

| CN | 115453755 A | 12/2022 |
| CN | 115793119 A | 3/2023 |
| CN | 117761822 A | 3/2024 |

OTHER PUBLICATIONS

Notice of Grant issued in Chinese Patent Application No. 202410833526.1; mailed Aug. 15, 2024; 4 pgs.

* cited by examiner one-dimensional grating first grating one-dimensional grating     first grating one-dimensional grating first grating one-dimensional grating first grating

LIGHT GUIDE DEVICE, OPTICAL DISPLAY SYSTEM AND DISPLAY DEVICE

CROSS-REFERENCE TO RELATED APPLICATIONS

The present application claims priority to Chinese Patent Application No. 202410833526.1, filed on Jun. 26, 2024, the entire contents of which are incorporated herein by reference.

TECHNICAL FIELD

The present application relates to the technical field of optical, and in particular to a light guide device, an optical display system, and a display device.

BACKGROUND

The augmented reality (AR) technology integrates the real world with virtual images through micro-displays and optical elements, providing users with an immersive visual experience. In this integration process, the light guide device plays a crucial role, and the optical waveguide technology is the mainstream technical solution for this fusion. The optical waveguide technology, relying on the total internal reflection, achieves the effective light conduction, allowing users to integrate into the virtual world without breaking the perception of the real world. However, despite the significant advantages of the optical waveguide technology, it still faces some challenges in practical applications.

The diffraction structure adopted at different positions at the optical waveguide device results in a lower transmittance of ambient light in these regions compared to regions without the diffraction structure. Particularly, in regions where the one-dimensional grating and the two-dimensional grating are used together, this discrepancy is especially pronounced, which causes users to perceive unevenly bright and dark regions within the lens when wearing the AR equipment, affecting the observation of the external environment and reducing the comfort of wearing. In Addition, the diffraction efficiency between the two different types of grating structures varies significantly, and users will see distinct bright and dark blocky or striped light regions during the operation of the optical waveguide, which is called as the screen door effect and severely affects the user's wearing experience.

SUMMARY

The objective of the present application is to provide a light guide device, an optical display system, and a display device.

The present application provides a light guide device, including a substrate and a first diffraction structure provided at the substrate,
the first diffraction structure includes a first grating;
the first grating includes a plurality of first grating units provided at intervals of a first period $P_1$ along a first vector direction $u_1$ and at intervals of a second period $P_2$ along a second vector direction $u_2$;
the first vector direction $u_1$ is intersected with the second vector direction $u_2$, the first period $P_1$ is longer than the second period $P_2$, forming unequal periods in two vector directions, and the first period $P_1$ is at least 1.5 times the second period $P_2$.

In an embodiment, the light guide device further includes a second diffraction structure provided at the substrate;
the second diffraction structure is configured for coupling incident light into the substrate;
the substrate is configured for totally reflecting the incident light from the second diffraction structure to the first diffraction structure;
the first diffraction structure is configured for coupling out light and is composed of the first grating, and the first grating is an improved one-dimensional grating with a period of P and a vector direction of u;
the first grating satisfies:

$$\frac{2\pi}{P_{IC}}u_{IC} + \frac{2\pi}{P}u + \frac{2\pi}{P_2}u_2 = 0;$$

and
$P_{IC}$ is a grating period of the second diffraction structure, $u_{IC}$ is a vector direction of the second diffraction structure, and $P_{IC}$ and $u_{IC}$ constitute grating vector information of the second diffraction structure.

In an embodiment, the first diffraction structure further includes a second grating, and the second grating includes a plurality of second grating units;
the plurality of second grating units are provided at intervals of a third period $P_3$ along a third vector direction $u_3$ and at intervals of a fourth period $P_4$ along a fourth vector direction $u_4$, and the third vector direction $u_3$ is intersected with the fourth vector direction $u_4$;
the first grating is combined with the second grating in a set manner; and
the first vector direction $u_1$ is same as the third vector direction $u_3$, the first period $P_1$ is same as the third period $P_3$, and the second vector direction $u_2$ and the fourth vector direction $u_4$ are on a same line.

In an embodiment, the light guide device further includes a second diffraction structure provided at the substrate,
the second diffraction structure is configured for coupling the incident light into the substrate;
the substrate is configured for totally reflecting the incident light from the second diffraction structure to the first diffraction structure; and
the first diffraction structure is configured for coupling out the light.

In an embodiment, the light guide device satisfies: $|K_0+\Delta K_{IC}\pm\Delta K_2|>(2\pi/\lambda)*n_2$;
$K_0$ is vector information of the incident light, $K_0=(2\pi/\lambda)u_0$, $\lambda$ is a wavelength of the incident light, and $u_0$ is an incident direction;
$\Delta K_{IC}$ is the grating vector information of the second diffraction structure;
$\Delta K_2$ is second vector information of the first grating and includes the second vector direction $u_2$ and the second period $P_2$; and
$n_2$ is a refractive index of the substrate.

In an embodiment, the light guide device satisfies: $|K_0+\Delta K_{IC}+\Delta K_4\pm\Delta K_2|>(2\pi/\lambda)*n_2$;
$K_0$ is vector information of the incident light, $K_0=(2\pi/\lambda)u_0$, $\lambda$ is a wavelength of the incident light, and $u_0$ is an incident direction;
$\Delta K_{IC}$ is the grating vector information of the second diffraction structure;
$\Delta K_4$ is fourth vector information of the second grating and includes the fourth vector direction $u_4$ and the fourth period $P_4$;

$\Delta K_2$ is second vector information of the first grating and includes the second vector direction $u_2$ and the second period $P_2$; and $n_2$ is a refractive index of the substrate.

In an embodiment, the light guide device satisfies: $|K_0 + \Delta K_{JC} + \Delta K_3 \pm \Delta K_2| > (2\pi/\lambda)*n_2$;

$K_0$ is vector information of the incident light, $K_0 = (2\pi/\lambda) u_0$, $\lambda$ is a wavelength of the incident light, $u_0$ is an incident direction;

$\Delta K_{JC}$ is the grating vector information of the second diffraction structure;

$\Delta K_3$ is third vector information of the second grating and includes the third vector direction $u_3$ and the third period $P_3$;

$\Delta K_2$ is second vector information of the first grating and includes the second vector direction $u_2$ and the second period $P_2$; and n2 is a refractive index of the substrate.

In an embodiment, the first grating unit includes one or more sub-gratings.

The present application further provides an optical display system, including:

the light guide device as described above; and an optical machine configured for projecting light onto the light guide device.

The present application further provides a display device, including:

a housing; and the optical display system as described above, the optical display system is provided in the housing.

The beneficial effects of the present application are as follows:

The light guide device provided in the embodiments of the present application aims to improve the one-dimensional grating such that the one-dimensional grating has unequal periods in two directions: the first period $P_1$ and the second period $P_2$. This grating design can be used alone or is particularly suitable for the use in combination with the two-dimensional grating, which helps to reduce the bright and dark differences and the screen door effect caused by the use of both one-dimensional and two-dimensional gratings. Thus, the lighting effect of the light guiding device can be optimized, which is beneficial for enhancing the comfort and overall visual experience of users wearing the display device.

Through the detailed description of embodiments with reference to the accompanying drawings, other features and their advantages of the present specification will become clear.

BRIEF DESCRIPTION OF THE DRAWINGS

The drawings incorporated in and forming a part of the present specification illustrate embodiments of the present application and explain the principles of the present application together with the description.

DETAILED DESCRIPTION OF THE EMBODIMENTS

Detailed embodiments of the present application will now be described with reference to the accompanying drawings. It should be noted that the relative arrangement of components and steps, numerical expressions, and values described in these embodiments are not intended to limit the scope of the application unless specifically stated otherwise.

The following description of at least one exemplary embodiment is merely illustrative and should not be construed as a limitation on the application or its use. Techniques and equipment known to those skilled in the art may not be discussed in detail, but such techniques and equipment should be considered part of the specification where appropriate.

In all examples shown and discussed herein, any specific values should be interpreted merely as illustrative and not as limitations. Therefore, other examples of exemplary embodiments may have different values.

It should be noted that similar reference numbers and letters in the following drawings represent similar items, and therefore, once an item is defined in one drawing, it does not need to be further discussed in subsequent drawings.

The following description, in conjunction with the drawings, provides a detailed description of the light guide device, the optical display system, and the display device according to embodiments of the present application.

Figure 1:
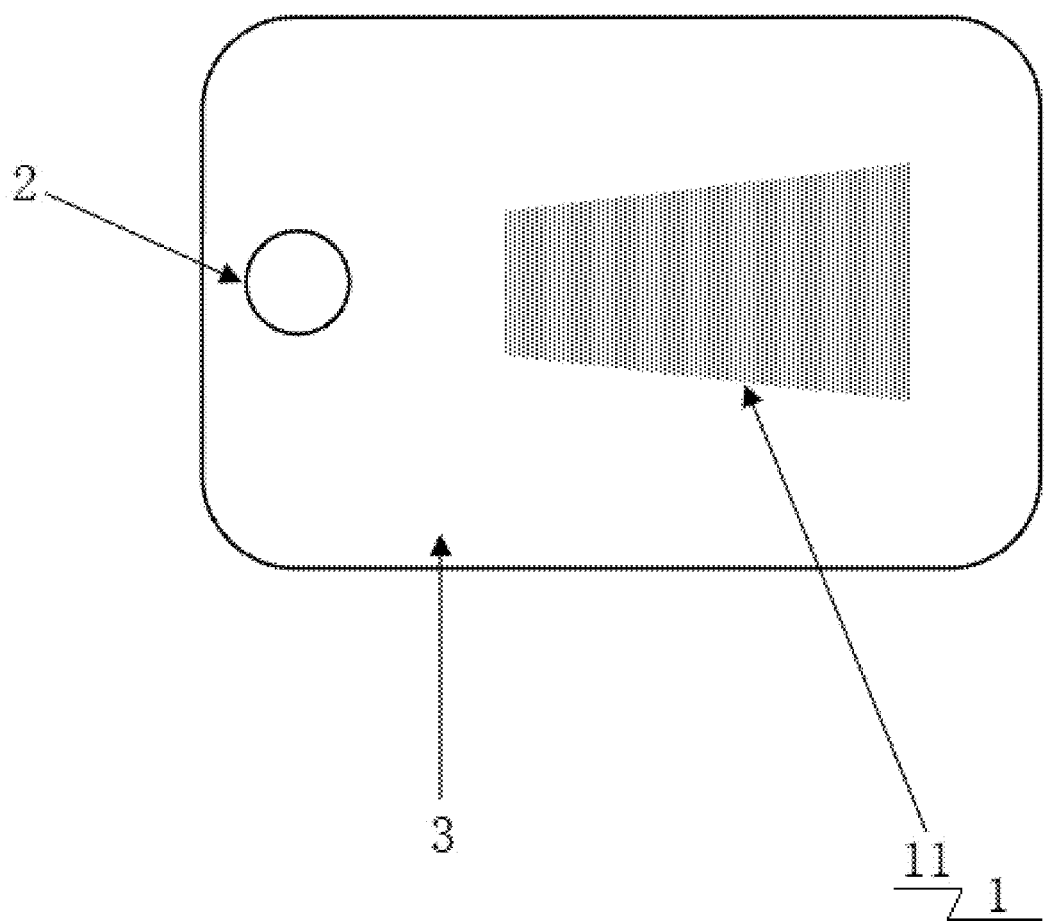
FIG. 1 is a structural schematic diagram of a light guide device according to an embodiment of the present application.
Figure 4:
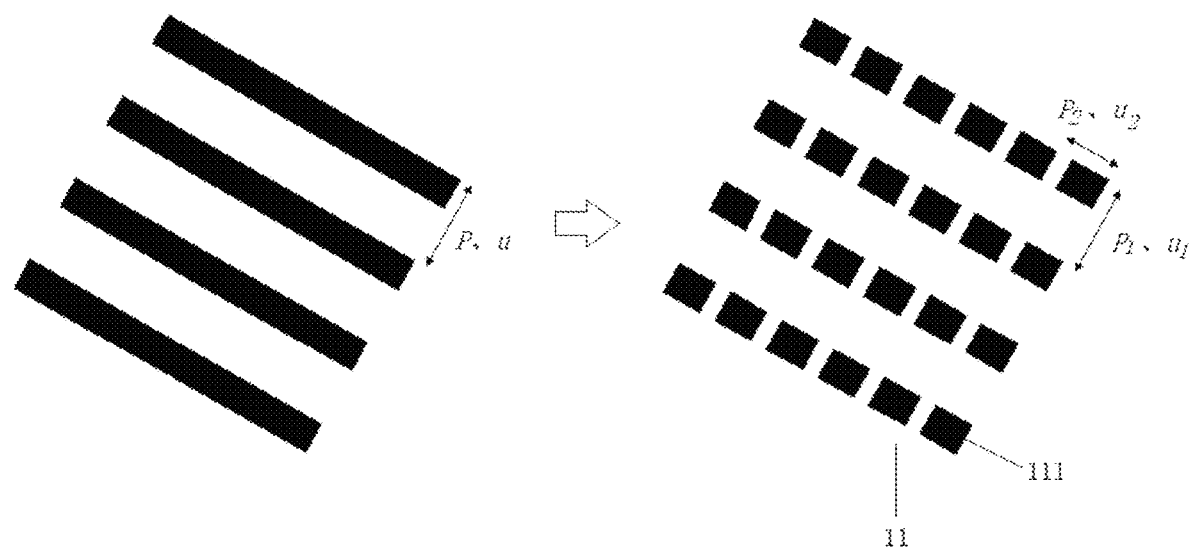
FIG. 4 is a comparison diagram of a conventional one-dimensional grating with the first grating provided in the present application.
Figure 22:
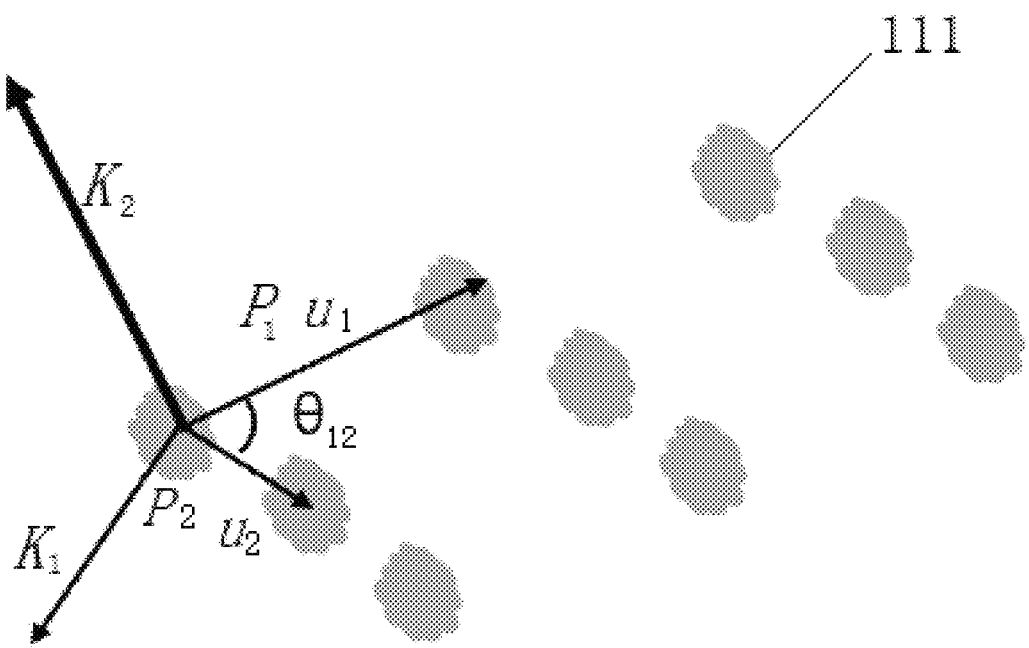
FIG. 22 is a schematic diagram of a diffraction principle of the first grating provided in the present application.

According to an embodiment of the present application, a light guide device is provided. As shown in FIG. 1, the light guide device includes a substrate 3 and a first diffraction structure 1 provided at the substrate 3. The first diffraction structure 1 includes a first grating 11. As shown in FIG. 4, the first grating includes a plurality of first grating units 111 provided at a first period $P_1$ along a first vector direction $u_1$ and at a second period $P_2$ along a second vector direction $u_2$. The first vector direction $u_1$ is intersected with the second vector direction $u_2$, and the first period $P_1$ is much longer than the second period $P_2$, as shown in FIG. 22, to form unequal periods in two vector directions. The first period $P_1$ is at least 1.5 times the second period $P_2$.

The light guide device provided in the present application, for example, is a diffraction optical waveguide plate, which can be used for light transmission. The light guide device can be applied in, for example, the augmented reality technology or the mixed reality technology.

The following detailed description is given with the light guide device as the diffraction optical waveguide plate.

The light guide device in the present application includes a substrate 3 and a first diffraction structure 1 provided at the substrate 3. The first diffraction structure 1 can include a specially designed first grating 11. The design of the first grating 11 is particularly critical. As shown in FIGS. 4, 6, 8, 10, 12, 14, and 16, the first grating 11, for example, can be composed of a plurality of first grating units 111, which are provided not only at the first period $P_1$ along the first vector direction $u_1$, but also at the second period $P_2$ along the second vector direction $u_2$. The first vector direction $u_1$ is intersected with the second vector direction $u_2$, forming an angle $\theta_{12}$, as shown in FIG. 22. The two-dimensional arrangement endows the first grating 11 with the ability to control light in two different dimensions. It should be noted that the first period $P_1$ of the first grating 11 is greater than the second period $P_2$, resulting in the unequal period. Specifically, the first period $P_1$ is much longer than the second period $P_2$. For example, the first period $P_1$ is 1.5 times, 2 times, or other multiples of the second period $P_2$.

In an embodiment of the present application, the first grating 11 is provided with unequal periods in two different vector directions, which can be used to replace traditional one-dimensional gratings, and form a new version one-dimensional grating. This design can be used to overcome problems when traditional one-dimensional gratings are used in conjunction with two-dimensional gratings. Of course, the first grating 11 provided in the present application can also be used alone as needed, which is not limited in the present application.

The significantly unequal period of the first grating 11 helps to reduce the light and dark differences when one-dimensional gratings and two-dimensional gratings are used together. In traditional designs, due to the different periods and characteristics of one-dimensional and two-dimensional gratings, the corresponding regions may visually present different light and dark effects, affecting the user's observation of the external environment and the overall comfort of wearing optical waveguide devices. The two unequal period designs of the first grating 11 can balance this difference to an extent, making the entire light guide device appear more uniform visually and enhancing the user's wearing experience.

The design of the first grating 11 helps to reduce the "screen door effect". The screen door effect is typically an interference phenomenon visually caused by the periodic structure of the grating, manifesting as alternating light and dark blocks or stripes. In the first grating 11, due to the different periods in the two vector directions, this periodic structure is dispersed and weakened visually, thereby reducing the occurrence of the screen door effect. This allows the light guide device to present a clearer, more natural image during operation, further enhancing the user's wearing experience.

In addition, the design of the first grating 11 offers high flexibility. Since the periods in the two vector directions can be adjusted independently, the performance of the first grating 11 can be optimized according to specific application requirements. For example, by adjusting the size and proportion of the first period $P_1$ and the second period $P_2$, the diffraction efficiency and directivity of the grating can be changed, thereby achieving different optical effects. This flexibility enables the first grating 11 to adapt to more application scenarios and meet the needs of different users.

The light guide device provided in the present application is provided with the unequal period structure and the arrangement in two vector directions. This design not only helps to reduce the light and dark differences and screen door effect caused by the use of one-dimensional and two-dimensional gratings together, but also has high flexibility and adaptability, meeting the needs of different application scenarios.

In an embodiment, the light guide device further includes a second diffraction structure 2 provided at the substrate 3 and configured for coupling the incident light into the substrate 3. The substrate 3 is configured for totally internally reflecting the incident light from the second diffraction structure 2 to the first diffraction structure 1.

The first diffraction structure 1 is configured for coupling out the light and is composed of the first grating 11, which is an improved one-dimensional grating with a period P and a vector direction u.

The first grating 11 satisfies the following relationship:

$$\frac{2\pi}{P_{IC}}u_{IC} + \frac{2\pi}{P}u + \frac{2\pi}{P_2}u_2 = 0;$$

where $P_{IC}$ is the grating period of the second diffraction structure 2, $u_{IC}$ is the vector direction of the second diffraction structure 2, and $P_{IC}$ and $u_{IC}$ constitute the grating vector information of the second diffraction structure 2.

Figure 12:
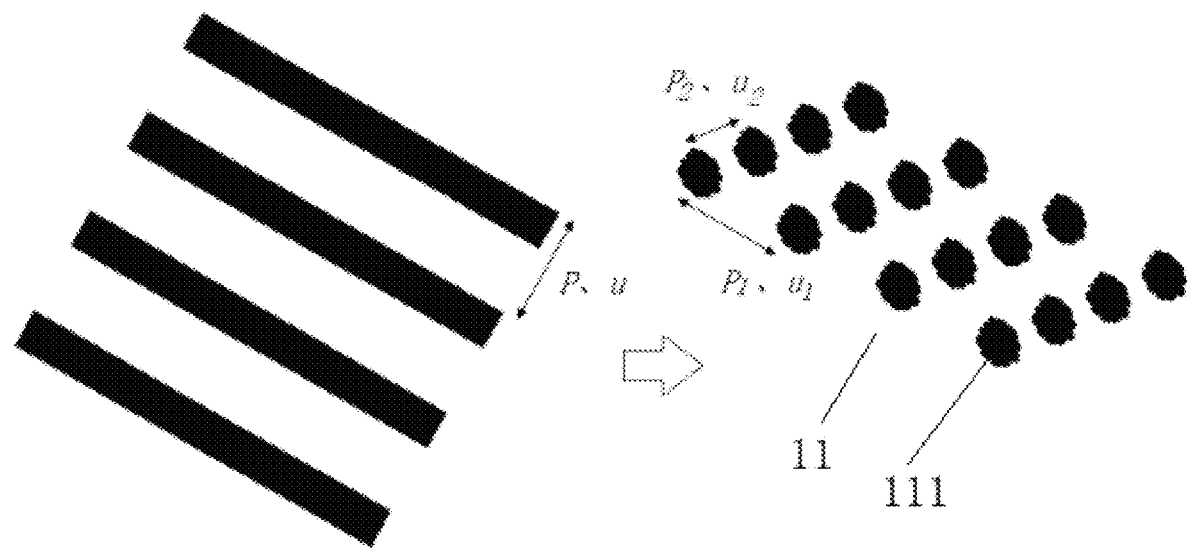
FIG. 12 is a comparison diagram of the conventional one-dimensional grating with the first grating provided in the present application.
Figure 14:
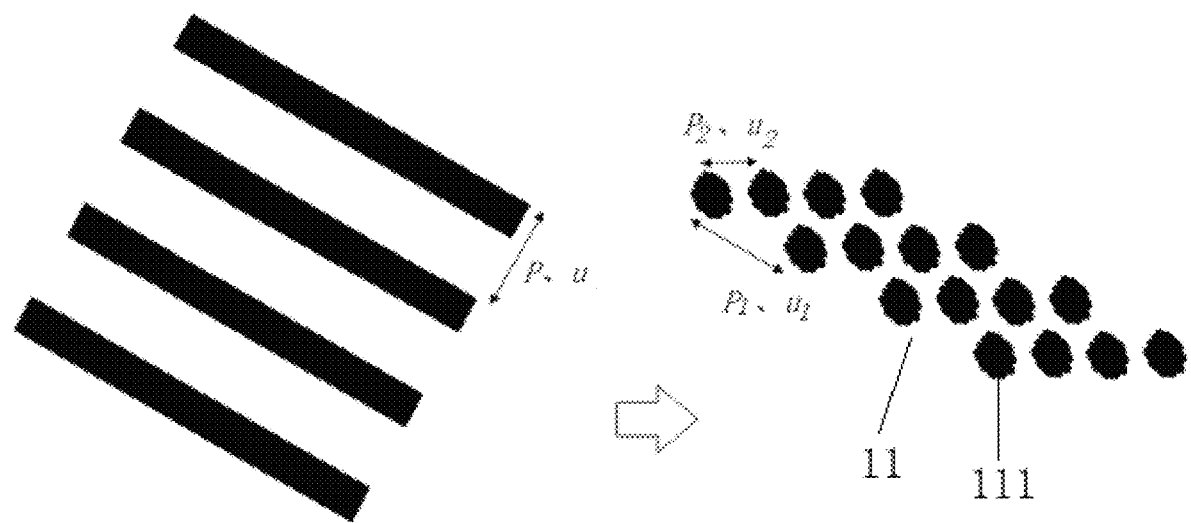
FIG. 14 is a comparison diagram of the conventional one-dimensional grating with the first grating provided in the present application.

It should be noted that the design of the first period $P_1$ (long period) in the first grating 11, in terms of vector direction and size, can follow the vector direction and size of the one-dimensional grating, as shown in FIGS. 4, 6, 8, 10, and 16. Of course, the vector direction and size of the first period $P_1$ (long period) in the first grating 11 can also be different from the one-dimensional grating, as shown in FIGS. 12 and 14.

A key point of the present application is the design of the second period $P_2$ (short period) of the first grating 11.

Figure 5:
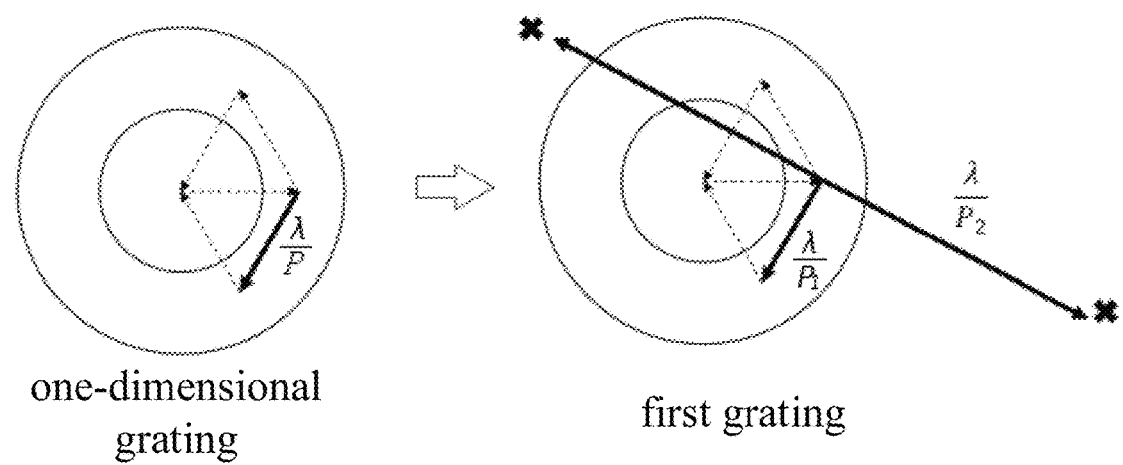
FIG. 5 is a K space distribution diagram of the one-dimensional grating and the first grating in FIG. 4.

In an embodiment, as shown in FIG. 4, the left-side diagram in FIG. 4 shows a one-dimensional grating with a period P and a vector direction u. The right-side diagram in FIG. 4 shows the first design of the first grating 11 of the present application, where the first grating unit 111 is rectangular. By comparing the left-side diagram and the right-side diagram in FIG. 4, it can be seen that the size and vector direction of the first period $P_1$ (long period) in the right-side diagram are the same as those of the one-dimensional grating shown in the left-side diagram (i.e., $P_1=P$, $u_1=u$). As shown in FIG. 5, the left-side diagram in FIG. 5 shows the K vector distribution diagram of the one-dimensional grating in FIG. 4, and the right-side diagram in FIG. 5 shows the K vector distribution diagram of the first grating 11 in FIG. 4. By comparing these two K vector distribution diagrams, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 along the second vector direction $u_2$ does not affect its transmission performance for the ambient light.

Figure 6:
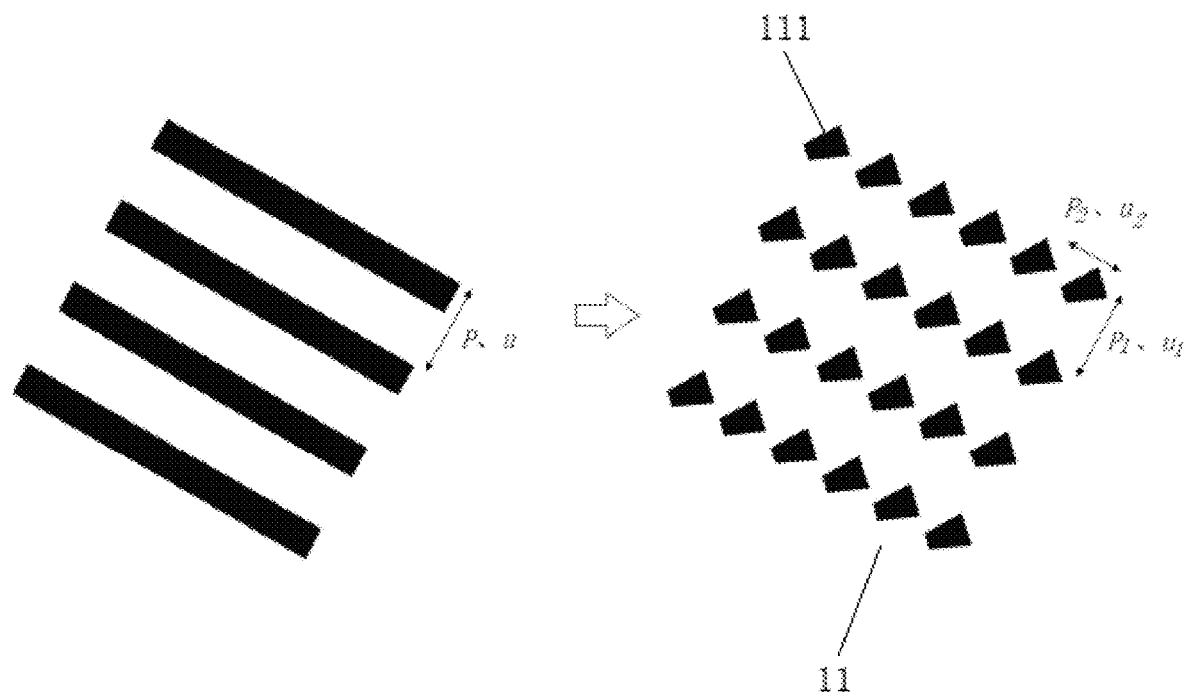
FIG. 6 is a comparison diagram of the conventional one-dimensional grating with the first grating provided in the present application.
Figure 7:
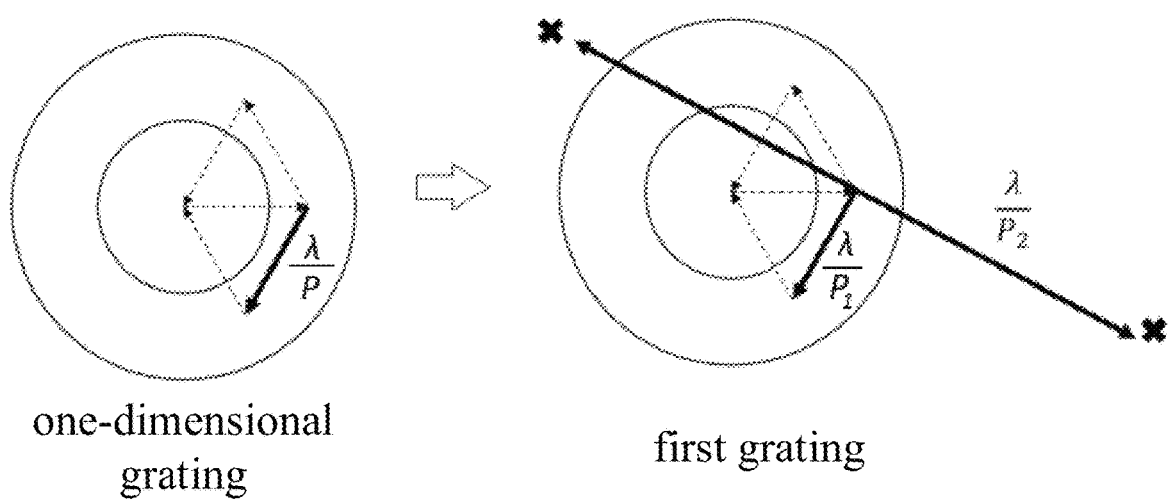
FIG. 7 is a K space distribution diagram of the one-dimensional grating and the first grating in FIG. 6.

In an embodiment, as shown in FIG. 6, the left-side diagram in FIG. 6 shows a one-dimensional grating with a period P and a vector direction u. The right-side diagram in FIG. 6 shows the second design of the first grating 11 in the present application, which is different from the first grating 11 shown in FIG. 4. In this design, the first grating unit 111 is trapezoidal. In FIG. 6, the size and vector direction of the first period $P_1$ (long period) in the right-side diagram are the same as those of the one-dimensional grating shown in the left-side diagram (i.e., $P_1=P$, $u_1=u$). Referring to FIG. 7, the left-side diagram in FIG. 7 shows the K vector distribution diagram of the one-dimensional grating in FIG. 6, and the right-side diagram in FIG. 7 shows the K vector distribution diagram of the first grating 11 in FIG. 6. By comparing these two K vector distribution diagrams in FIG. 6, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 along the second vector direction $u_2$ does not affect its transmission performance for the ambient light.

Figure 8:
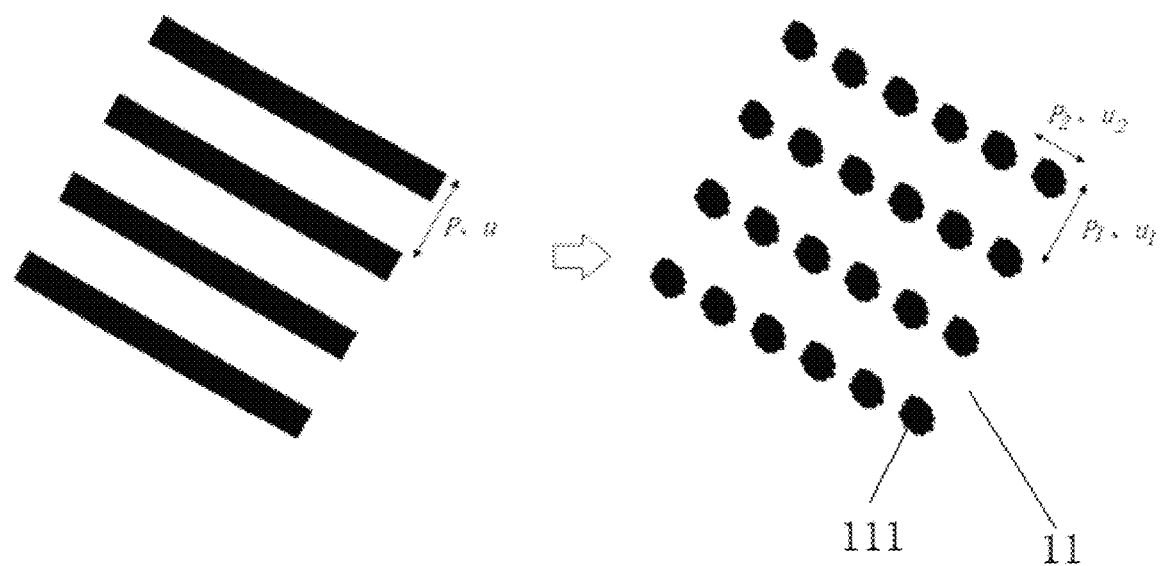
FIG. 8 is a comparison diagram of the conventional one-dimensional grating with the first grating provided in the present application.
Figure 9:
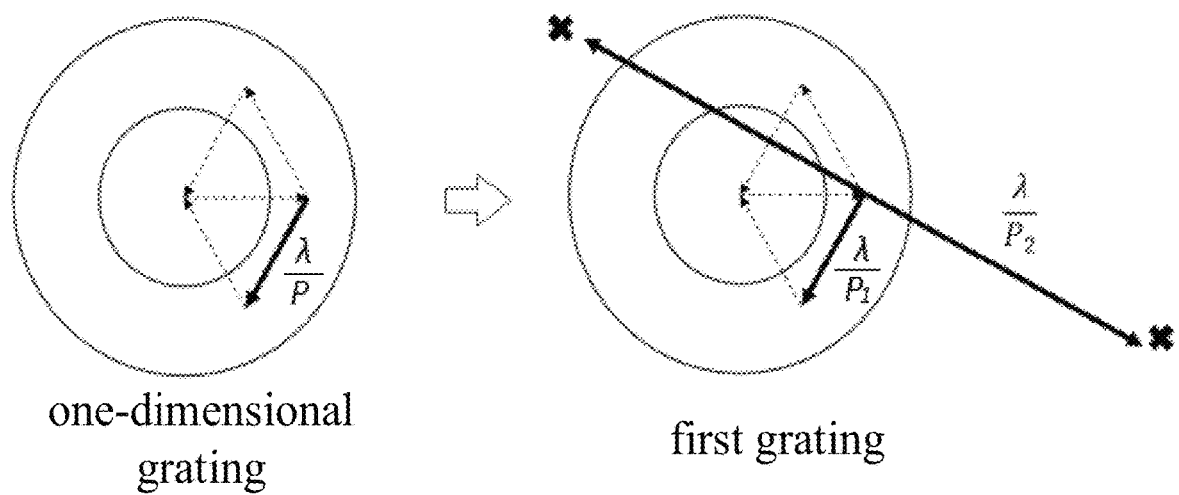
FIG. 9 is a K space distribution diagram of the one-dimensional grating and the first grating in FIG. 8.

In an embodiment, as shown in FIG. 8, the left-side diagram in FIG. 8 shows a one-dimensional grating with a period P and a vector direction u. The right-side diagram in FIG. 8 shows the first grating 11 in the present application, where the first grating units 111 have a curved shape. In FIG. 8, the size and vector direction of the first period $P_1$ (long period) in the right-side diagram are the same as those of the one-dimensional grating shown in the left-side diagram (i.e., $P_1=P$, $u_1=u$). Referring to FIG. 9, the left-side diagram in FIG. 9 shows the K vector distribution diagram of the one-dimensional grating in FIG. 8, and the right-side diagram in FIG. 9 shows the K vector distribution diagram of the first grating 11 in FIG. 8. By comparing these two K vector distribution diagrams in FIG. 9, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 in the second vector direction $u_2$ does not affect its transmission performance for the ambient light.

Figure 10:
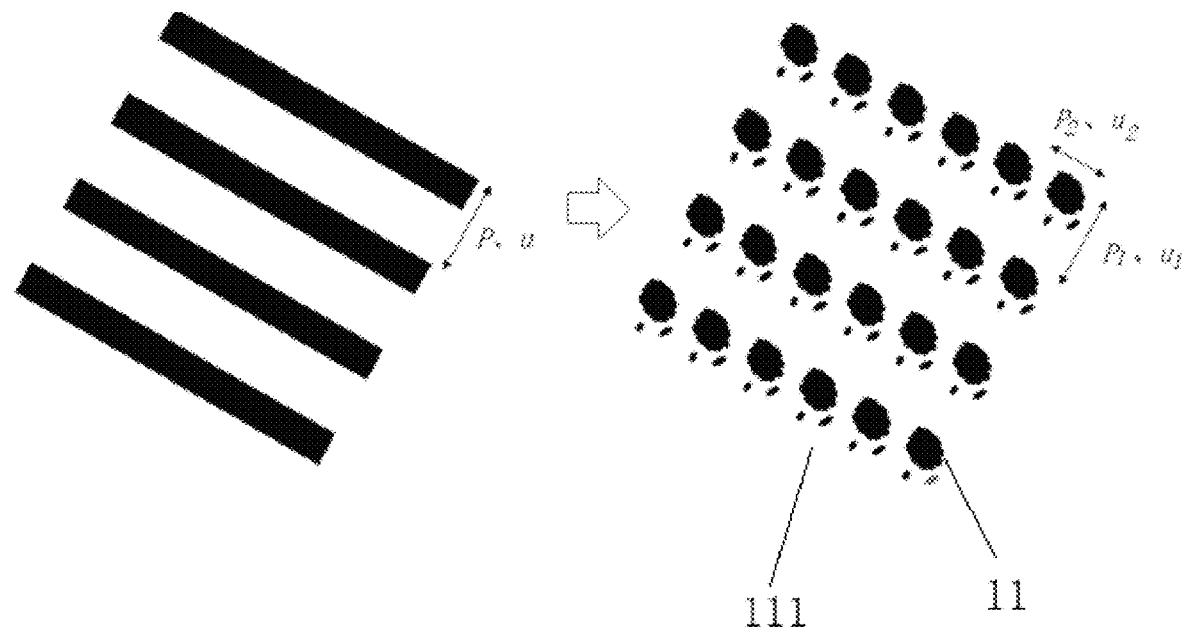
FIG. 10 is a comparison diagram of the conventional one-dimensional grating with the first grating provided in the present application.
Figure 11:
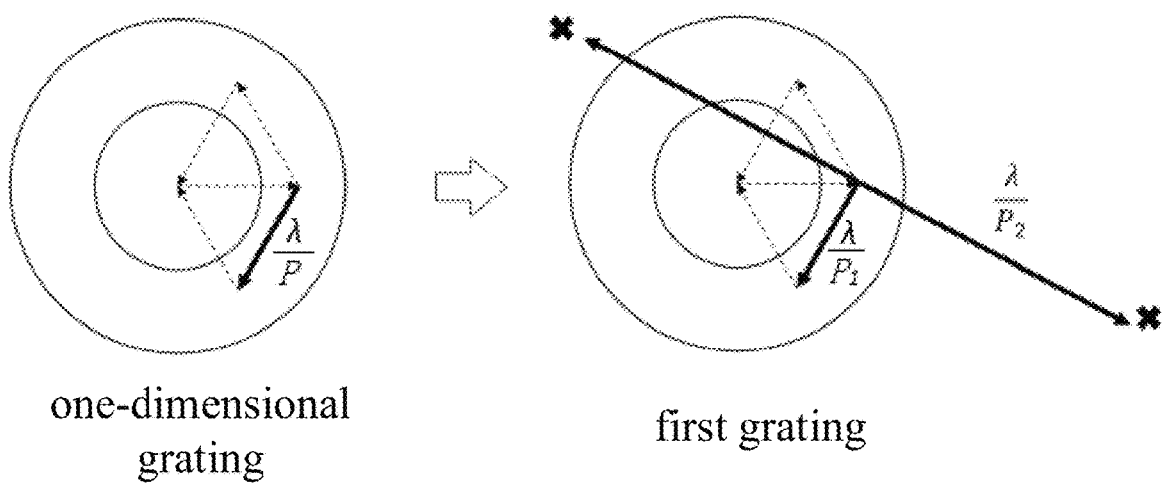
FIG. 11 is a K space distribution diagram of the one-dimensional grating and the first grating in FIG. 10.

In an embodiment, as shown in FIG. 10, the left-side diagram in FIG. 10 shows a one-dimensional grating with a period P and a vector direction u. The right-side diagram in FIG. 10 shows the first grating 11 in the present application, where the first grating units 111 are a combination of multiple polygons and curved shapes. In FIG. 10, the size and vector direction of the first period $P_1$ (long period) in the right-side diagram are the same as those of the one-dimensional grating shown in the left-side diagram (i.e., $P_1=P$, $u_1=u$). Referring to FIG. 11, the left-side diagram in FIG. 11 shows the K vector distribution diagram of the one-dimensional grating in FIG. 10, and the right-side diagram in FIG. 11 shows the K vector distribution diagram of the first grating 11 in FIG. 10. By comparing these two K vector distribution diagrams in FIG. 11, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 in the second vector direction $u_2$ does not affect its transmission performance for the ambient light.

Figure 13:
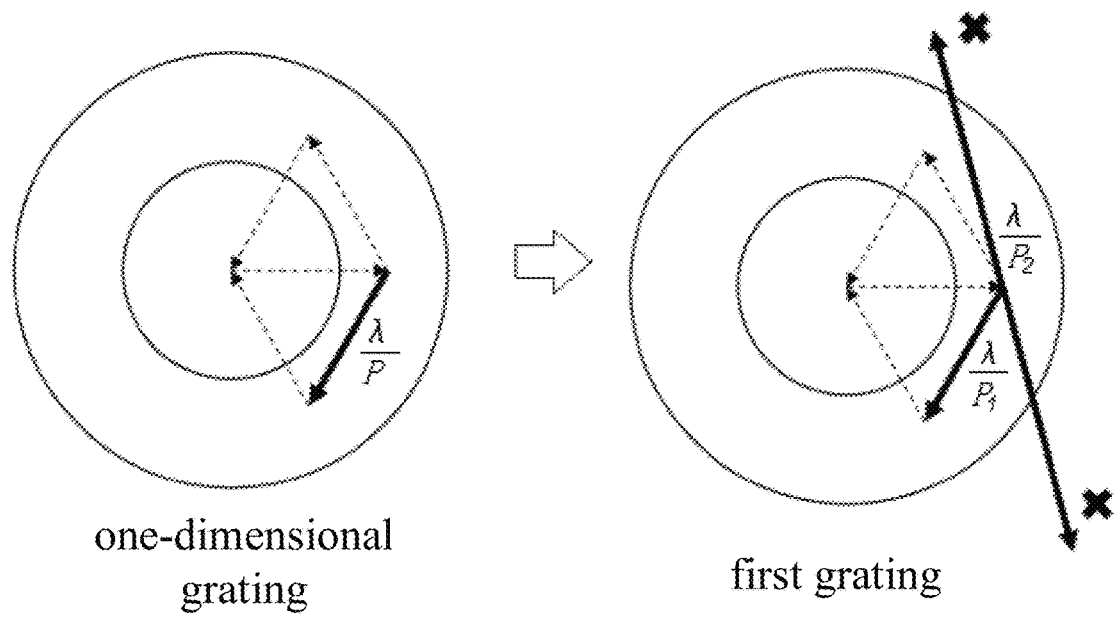
FIG. 13 is a K space distribution diagram of the one-dimensional grating and the first grating in FIG. 12.

In an embodiment, as shown in FIG. 12, the left-side diagram in FIG. 12 shows a one-dimensional grating with a period P and a vector direction u. The right-side diagram in FIG. 13 shows the first grating 11 in the present application, where the first grating units 111 are curved in shape. Unlike the first grating 11 in FIGS. 4, 6, 8, and 10, the size and vector direction of the first period $P_1$ (long period) in the right-side diagram of FIG. 12 are different from those of the one-dimensional grating shown in the left-side diagram (i.e., $P_1$ is different from P, and $u_1$ is in a different direction from u). Referring to FIG. 13, the left-side diagram in FIG. 13 shows the K vector distribution diagram of the one-dimensional grating in FIG. 12, and the right-side diagram in FIG. 13 shows the K vector distribution diagram of the first grating 11 in FIG. 12. By comparing these two K vector distribution diagrams in FIG. 13, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 in the second vector direction $u_2$ does not affect its transmission performance for the ambient light.

Figure 15:
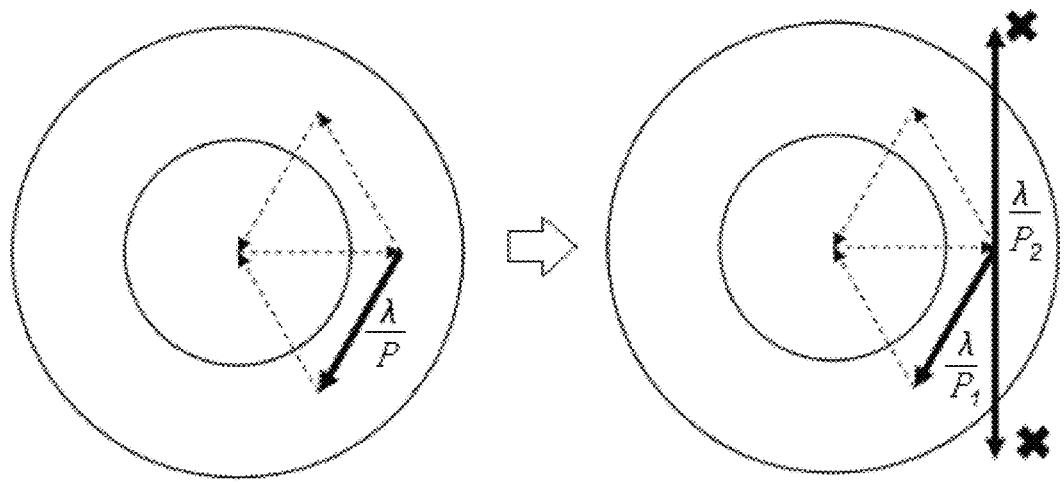
FIG. 15 is a K space distribution diagram of the one-dimensional grating and the first grating in FIG. 14.

In an embodiment, as shown in FIG. 14, the left-side diagram in FIG. 14 shows a one-dimensional grating with a period P and a vector direction u. The right-side diagram in FIG. 15 shows the first grating 11 in the present application, where the first grating units 111 are curved in shape. Similarly, the size and vector direction of the first period $P_1$ (long period) in the right-side diagram of FIG. 14 are also different from those of the one-dimensional grating shown in the left-side diagram (i.e., $P_1$ is different from P, and $u_1$ is in a different direction from u). Referring to FIG. 15, the left-side diagram in FIG. 15 shows the K vector distribution diagram of the one-dimensional grating in FIG. 14, and the right-side diagram in FIG. 15 shows the K vector distribution diagram of the first grating 11 in FIG. 14. By comparing these two K vector distribution diagrams in FIG. 15, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 in the second vector direction $u_2$ does not affect its transmission performance for the ambient light.

Figure 16:
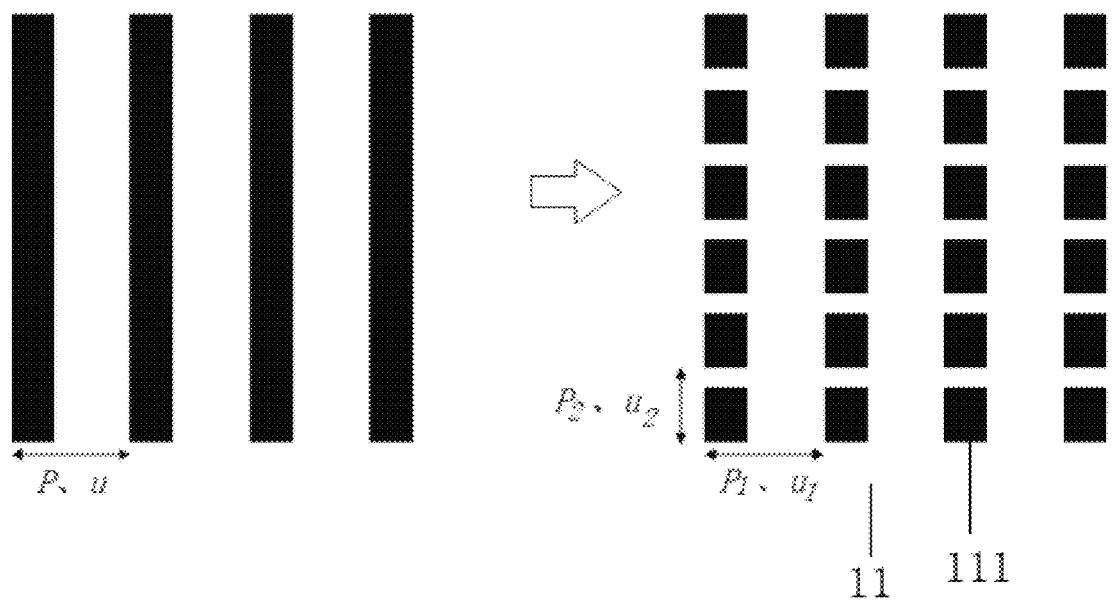
FIG. 16 is a comparison diagram of the conventional one-dimensional grating with the first grating provided in the present application.
Figure 17:
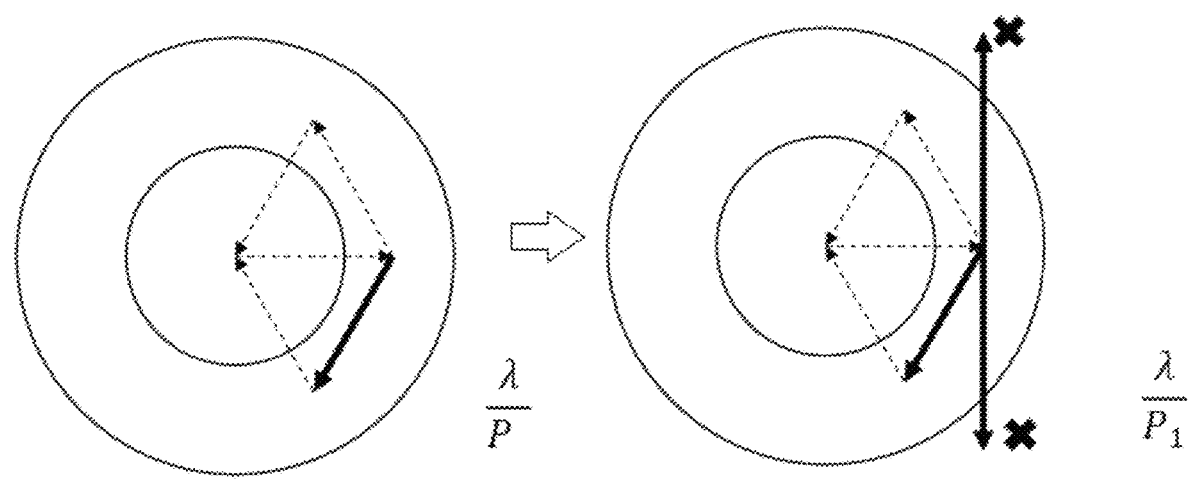
FIG. 17 is a K space distribution diagram of the one-dimensional grating and the first grating in FIG. 16.

In an embodiment, as shown in FIG. 16, the left-side diagram in FIG. 16 shows a one-dimensional grating with a period P and a vector direction u. The right-side diagram in FIG. 16 shows a design of the first grating 11 in the present application, where the first grating units 111 are rectangular in shape. In FIG. 16, the size and vector direction of the first period $P_1$ (long period) in the right-side diagram are the same as those of the one-dimensional grating shown in the left-side diagram (i.e., $P_1$=P, $u_1$=u). Referring to FIG. 17, the left-side diagram in FIG. 17 shows the K vector distribution diagram of the one-dimensional grating in FIG. 16, and the right-side diagram in FIG. 17 shows the K vector distribution diagram of the first grating 11 in FIG. 16. By comparing these two K vector distribution diagrams in FIG. 17, it can be seen that in the K vector distribution diagram of the first grating 11, due to the shorter second period $P_2$, the x-x lines corresponding to $\lambda/P_2$ are longer, and the two arrowhead endpoints of the x-x lines extend beyond the outer circle range. This indicates that the diffraction of the first grating 11 in the second vector direction $u_2$ does not affect its transmission performance for the ambient light.

According to the above embodiments, for the first grating 11 that is remodeled based on the one-dimensional grating, the size and direction of the first period $P_1$ (long period) of the first grating 11 can be different from the period size and direction of the one-dimensional grating, while the second period $P_2$ (short period) of the first grating 11 needs to be combined with the period and direction of the one-dimensional grating. When applied to the light guide device, it should satisfy the vectors that can form the three sides of a closed triangle with the coupling-in region of the light guide device, such as the second diffraction structure 2 mentioned above.

Figure 2:
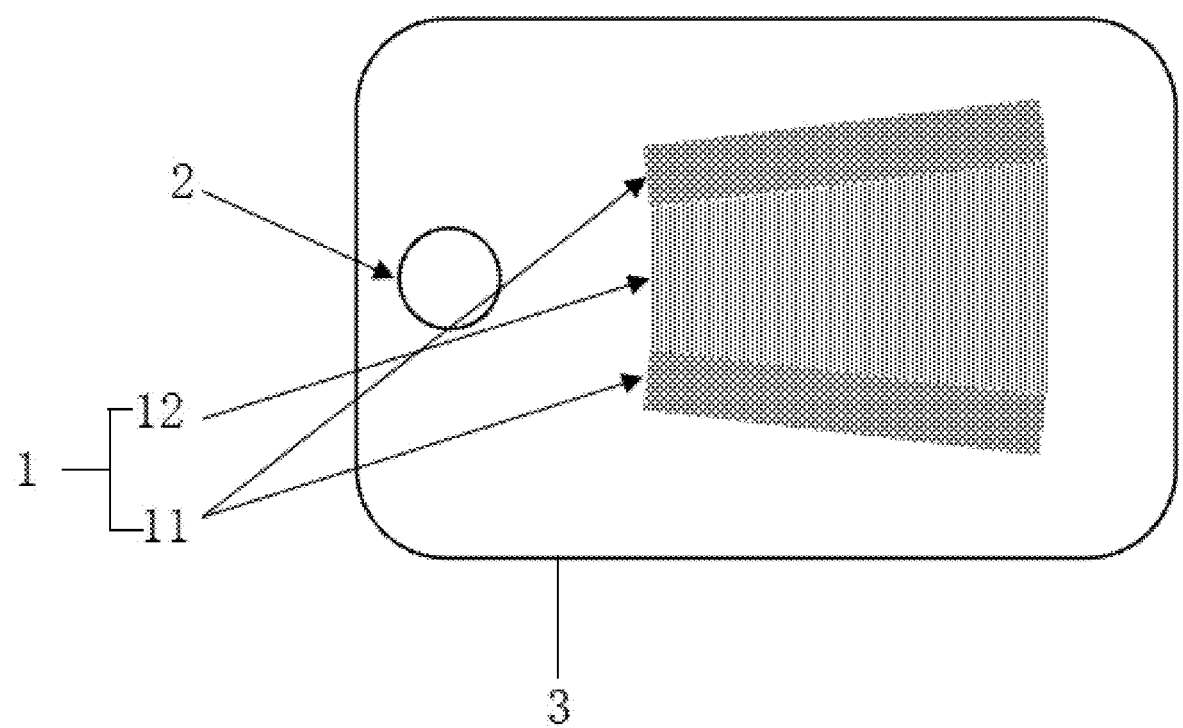
FIG. 2 is a structural schematic diagram of the light guide device according to an embodiment of the present application.
Figure 3:
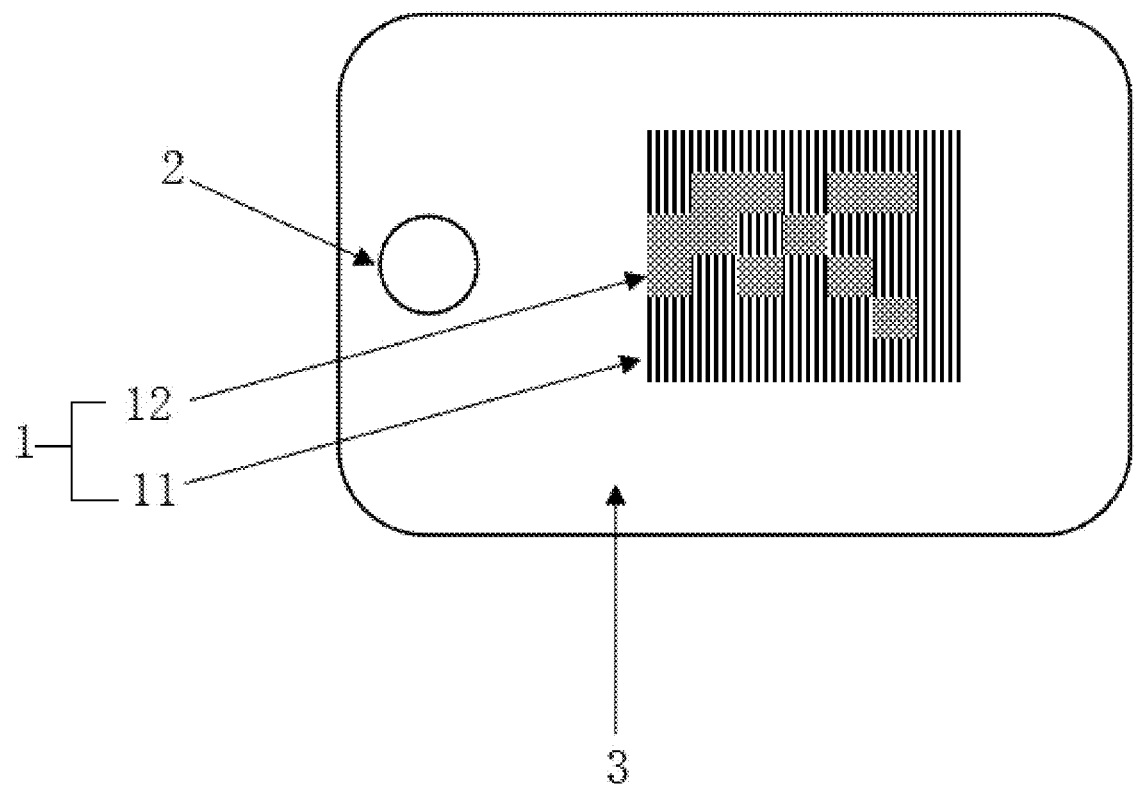
FIG. 3 is a structural schematic diagram of the light guide device according to an embodiment of the present application.
Figure 21:
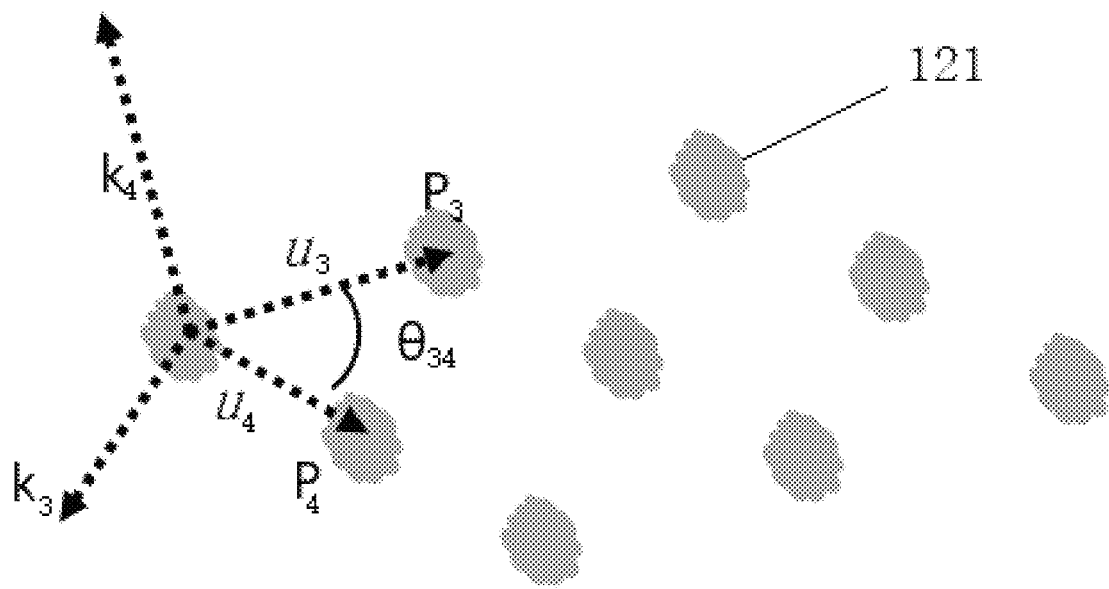
FIG. 21 is a schematic diagram of a diffraction principle of a conventional two-dimensional grating.

In an embodiment, as shown in FIG. 2 and FIG. 3, the first diffraction structure 1 also includes a second grating 12. The second grating 12 includes a plurality of second grating units provided at a third period $P_3$ along a third vector direction $u_3$ and at a fourth period $P_4$ along a fourth vector direction $u_4$. The third vector direction $u_3$ is intersected with the fourth vector direction $u_4$, as shown in FIG. 21. The first grating 11 and the second grating 12 are provided and combined in a set manner. The first vector direction $u_1$ is the same as the third vector direction $u_3$, the first period $P_1$ is the same as the third period $P_3$, and the second vector direction $u_2$ and the fourth vector direction $u_4$ are on the same line, which are the basic conditions to be met when the first grating 11 is combined with the second grating 12.

According to an embodiment, as shown in FIG. 2 and FIG. 3, the first diffraction structure 1 can include the first grating 11 and can also introduce a second grating 12, which, for example, can be a two-dimensional grating. In other words, the specially designed first grating 11 can be combined with a two-dimensional grating and applied to a specific diffraction region on the light guide device.

In an embodiment, as shown in FIG. 2, the first grating 11 can be provided on both sides of the second grating 12, forming a combined grating structure.

In an embodiment, as shown in FIG. 3, the second grating 12 can be dispersed, with the first grating 11 placed in the gaps between the second gratings 12.

It should be noted that the specific combination methods of the first grating 11 and the second grating 12 are illustrated in FIG. 2 and FIG. 3 as examples and are not limited to these two combination methods.

In the design of some diffraction optical waveguide plates, the coexistence of one-dimensional grating and two-dimensional grating is involved, which brings a significant issue: the regions corresponding to these two types of gratings are physically adjacent, and in some cases, they may even cross and overlap. For the user, this design leads to an undeniable problem: the interior of the lens will show unevenly lit regions, which not only greatly interferes with the user's clear observation of the external environment but also seriously affects the overall comfort of wearing the diffraction optical waveguide plate. Moreover, due to the significant differences in diffraction efficiency between the one-dimensional grating and the two-dimensional grating, users will see distinct bright and dark blocky or striped light regions during the operation of the optical waveguide, and the phenomenon is commonly called as the "screen door effect". This not only disrupts visual continuity but also greatly diminishes the wearing experience.

The first grating 11 provided in the present application addresses the above issues.

In regions where the one-dimensional grating and the two-dimensional grating need to be used together, the design in the present application is to replace the original one-dimensional grating with the first grating 11. This design not only maintains the function of the original grating region but also significantly improves the transmission rate difference of the ambient light between the two different gratings without compromising the optical performance of the light guide device. By using the first grating 11, the transmission rates of the first grating 11 and the second grating 12 (two-dimensional grating) can reach the same or similar levels, resulting in a more uniform and consistent lighting effect when in operation, which not only enhances the overall performance of the light guide device but also greatly increases the comfort of the wearer.

According to the embodiments in the application, it is mentioned in the description that the first vector direction $u_1$ of the first grating 11 is the same as the third vector direction $u_3$ of the second grating 12, which means that the first grating 11 and the second grating 12 have a periodic structure in the same direction to an extent. At the same time, the first period $P_1$ is the same as the third period $P_3$. Since the two vector directions are the same, the periods are also the same, indicating that the spacing of the grating units along this vector direction is the same in both the first grating 11 and the second grating 12. This helps to ensure that the optical characteristics, such as the diffraction angle, of the two gratings (i.e., the first grating 11 and the second grating 12) are consistent in the same direction. This design is intended to enable the first grating 11 to better form a cooperative relationship with the second grating 12, thereby achieving more precise control of the light.

Furthermore, the second vector direction $u_2$ of the first grating 11 and the fourth vector direction $u_4$ of the second grating 12 are on the same line, which means that there is a correlation between the two gratings in another direction. Although the periods ($P_2$ and $P_4$) in these two directions can be different, these two directions are parallel, meaning they are in the same plane. This design allows the two gratings to work together on a two-dimensional plane.

In the light guide device provided in the present application, the first diffraction structure 1 can be composed of two different gratings such as the first grating 11 and the second grating 12. The first grating 11 and the second grating 12 have the same periodicity and directionality in the $u_1$ or $u_3$ direction, which ensures that their optical behavior in this direction is consistent. This helps to reduce the difference in diffraction effects due to the different nature of the gratings, making the transmission of light more stable and consistent in this vector direction. When the second vector direction $u_2$ of the first grating 11 and the fourth vector direction $u_4$ of the second grating 12 are on the same line, this helps to optimize the structure of the grating in the direction perpendicular to this line, achieving a higher transmission rate of the ambient light. This means that the light guide device can allow more ambient light to pass through without affecting the main diffraction function, thereby improving the visual comfort of the wearer.

Due to the high consistency in design and parameters between the first grating 11 and the second grating 12, the diffraction patterns produced by the two when in operation will be more coordinated, reducing visual interference caused by differences in diffraction effects, such as the "screen door effect". This ultimately helps to improve the visual experience of the wearer and reduce the visual fatigue.

In addition, when the first grating 11 and the second grating 12 have the same parameters on a certain dimension (i.e., the periods in the $u_1$ and $u_3$ directions are the same), it simplifies the design and manufacturing process of the gratings. The same process and parameters can be used to produce these two gratings, reducing manufacturing errors and improving product yield and consistency.

In the embodiments of the present application, when the first grating 11 is used in conjunction with the two-dimensional grating, the transmission rate of the ambient light is optimized, thereby enhancing the lighting effect of the display device. For example, in the augmented reality (AR) display device, the high brightness and uniform light distribution are key to improving the user's experience. By optimizing the grating structure, the light guide device can provide a brighter, more uniform image, thereby enhancing the user's visual experience.

It should be noted that improving the lighting effect of the AR display device means that the AR display device can present brighter, clearer, and more vivid images, ensuring a good visual experience for users under different lighting conditions.

In some embodiments of the present application, as shown in FIG. 1 to FIG. 3, the light guide device also includes a second diffraction structure 2 provided at the substrate 3. The second diffraction structure 2 is configured to couple the incident light into the substrate 3. The substrate 3 is configured to totally internally reflect the incident light from the second diffraction structure 2 to the first diffraction structure 1, and the first diffraction structure 1 is configured to couple out the light.

The second diffraction structure 2 is provided on the substrate 3, and the main function of which is to couple the incident light into the interior of the substrate 3. That is, when the incident light from an external light source illuminates the second diffraction structure 2, the incident light is effectively introduced or captured into the substrate 3.

The substrate 3, serving as a medium for light propagation, has characteristics (such as refractive index) that allow incident light to propagate via total internal reflection within it. Specifically, after the light enters the substrate 3 from the second diffraction structure 2, it will propagate through the substrate 3 via the total internal reflection until it reaches the first diffraction structure 1.

The first diffraction structure 1 is also provided on the substrate 3, which serves a different function from the second diffraction structure 2. The main function of the first diffraction structure 1 is to couple out the incident light from the substrate 3 for imaging. When the incident light propagates within the substrate 3 and reaches the location of the first diffraction structure 1, it is guided by the first diffraction structure 1 and coupled out of the substrate 3, where it can be received by an observer or a detector.

When describing the embodiments in the present application, it should be noted that the first diffraction structure 1 is configured as the coupling-out region of the light guide device, and it can also be applied to the coupling-in region or the turning region of the light guide device. That is, the first diffraction structure 1 provided in the present application includes but is not limited to applications in the coupling-out region, and it has a broader applicability. However, since the application of the first diffraction structure 1 in the coupling-out region may be more common, the detailed description in the text primarily focuses on its application in the coupling-out region for a more intuitive understanding of its working principle and effects.

The light guide device provided in the present application, by optimizing the design of the first diffraction structure 1 and pairing it with the second diffraction structure 2, can significantly improve the utilization rate of the light energy. More incident light can be effectively introduced and propagated, ultimately being coupled out at the desired positions.

Figure 18:
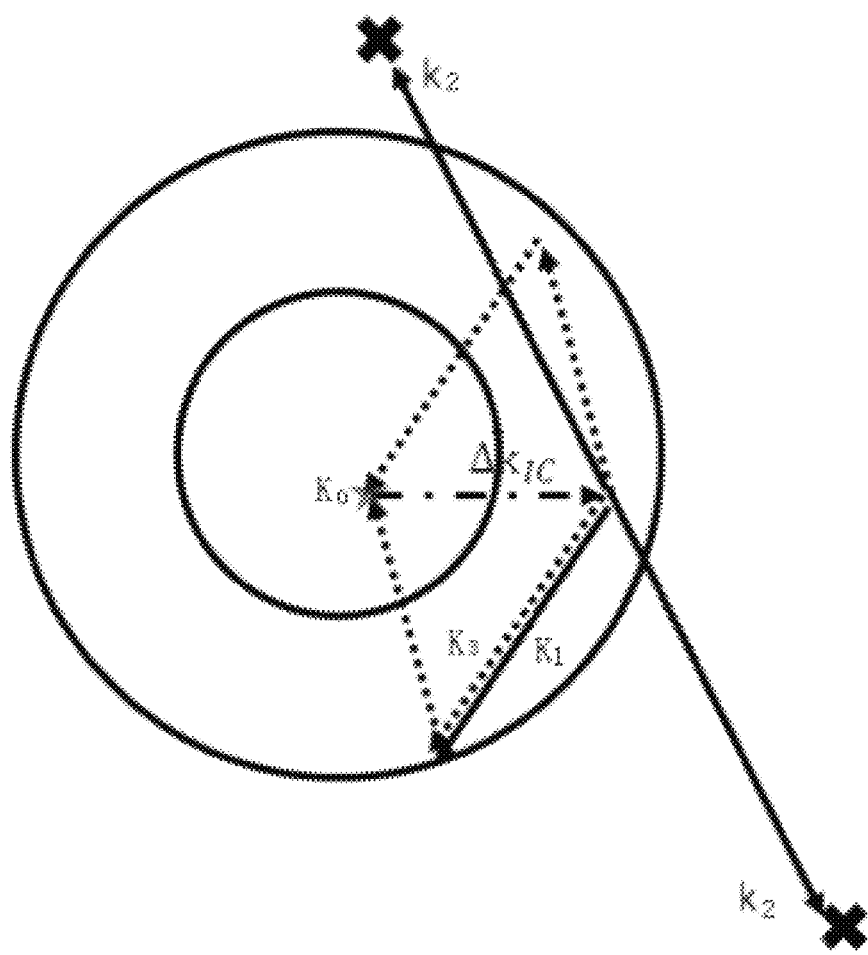
FIG. 18 is a K space distribution diagram of the light guide device according to an embodiment of the present application.
Figure 19:
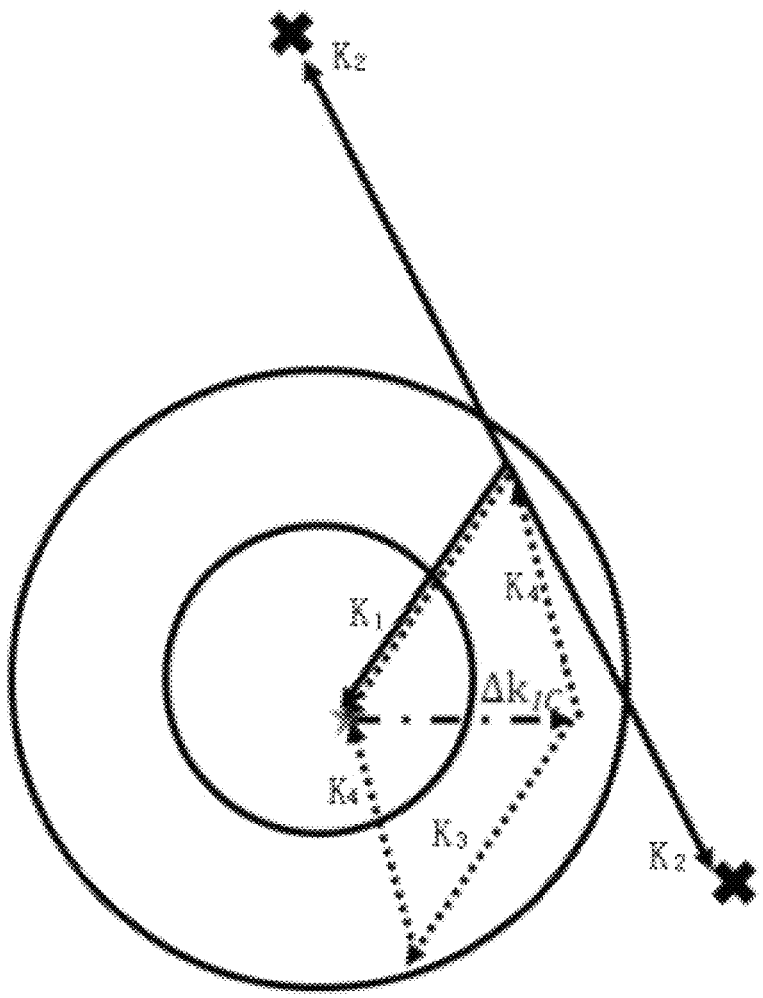
FIG. 19 is a K space distribution diagram of the light guide device according to an embodiment of the present application.
Figure 20:
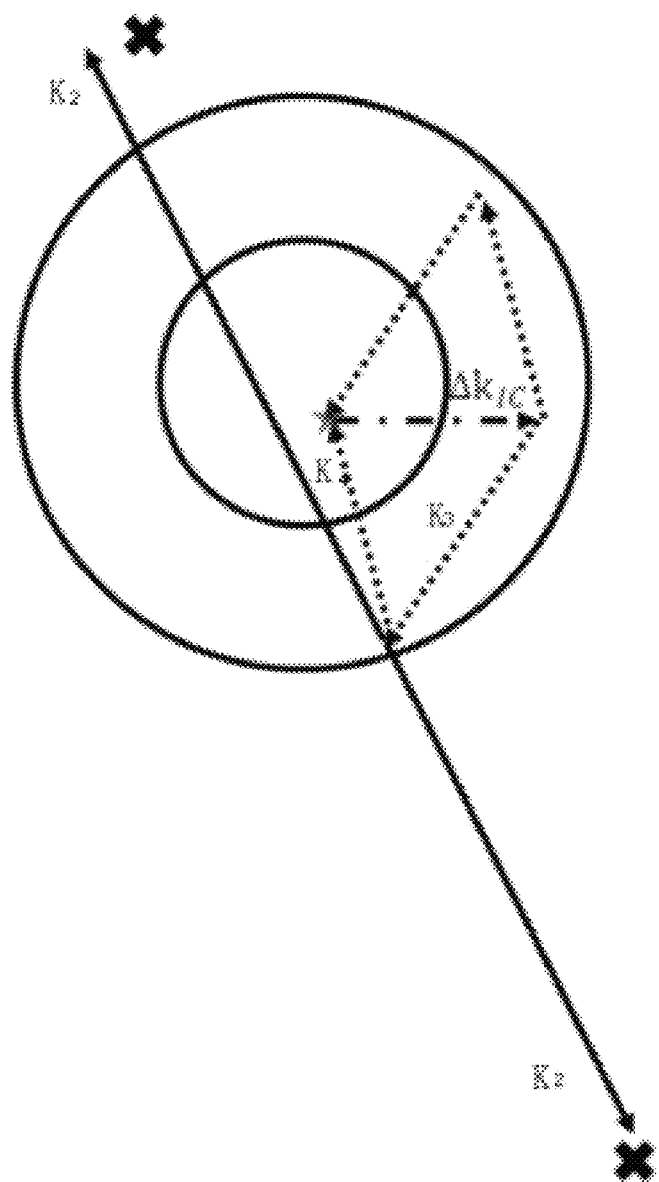
FIG. 20 is a K space distribution diagram of the light guide device according to an embodiment of the present application.

Referring to FIG. 18, FIG. 19, and FIG. 20, the small circles provided in the inner circle represent the refractive index of the external medium, while the large circles provided in the outer periphery represent the refractive index of the substrate 3. For example, when the external medium is air and the substrate 3 is made of glass with a refractive index of 1.9, the small circles in the inner circle satisfy $(2\pi/\lambda)*n1=(2\pi/\lambda)$, and the large circles in the outer periphery satisfy $(2\pi/\lambda)*n2=(2\pi/\lambda)*1.9$; where $\lambda$ is the wavelength of the incident light, $n_1$ is the refractive index of the external medium, and $n_2$ is the refractive index of the medium of the substrate 3.

Referring to FIG. 18 to FIG. 20, the pentagram at the center represents the k vector of the direction of the incident light, which is $k_0$, where $k_0=(2\pi/\lambda)u_0$, $u_0$ represents the incident direction of the incident light, and $\lambda$ is the wavelength of the incident light.

Referring to FIG. 18 to FIG. 20, the dashed line represents the grating vector information of the coupling-in grating, which corresponds to the second diffraction structure 2 in the present application, i.e., the dashed line represents the grating vector information $\Delta K_{IC}$ of the second diffraction structure 2, which includes the grating period $P_{IC}$ and the vector direction $u_{IC}$ of the second diffraction structure:

$$\Delta K_{IC} = \frac{2\pi}{P_{IC}} u_{IC}$$

It should be noted that when the second diffraction structure 2 is the one-dimensional grating, the vector direction $u_{IC}$ is perpendicular to the direction of the grating lines.

In FIG. 18 to FIG. 20, the dotted line represents the grating vector information of the two-dimensional grating, which is the second grating 12 in the present application, and includes the third grating vector information $\Delta K_3$ and the fourth grating vector information $\Delta K_4$, which are as follows:

$$\Delta K_3 = \frac{2\pi}{P_3^* \mathrm{Sin}\theta_{34}} u_3 \times z;$$

$$\Delta K_4 = \frac{2\pi}{P_4^* \mathrm{Sin}\theta_{34}} u_4 \times z;$$

$P_3$ and $P_4$ are the period sizes of the two-dimensional grating in two different vector directions, $u_3$ is the direction of the third period $P_3$, $u_4$ is the direction of the fourth period $P_4$, and Sin $\theta_{34}$ is the angle between the two different vector directions. Referring to FIG. 21, z is the direction perpendicular to the plane of the paper.

In FIG. 18 to FIG. 20, the solid line represents the grating vector information of the first grating 11 in this application, which includes the first grating vector information $\Delta K_1$ and the second grating vector information $\Delta K_2$, which are as follows:

$$\Delta K_1 = \frac{2\pi}{P_1^* \sin\theta_{12}} u_1 \times z;$$

$$\Delta K_2 = \frac{2\pi}{P_2^* \sin\theta_{12}} u_2 \times z;$$

$P_1$ and $P_2$ are the periods of the first grating 11 in two different vector directions, $u_1$ is the direction of the first period $P_1$, $u_2$ is the direction of the second period $P_2$, and Sin $\theta_{12}$ is the angle between the two different vector directions. Referring to FIG. 22, z is the direction perpendicular to the plane of the paper.

It should be noted that when the first grating 11 and the second grating 12 are used in combination, the basic condition to be met is that the first grating vector information $\Delta K_1$ of the first grating 11 is the same as the third grating vector information $\Delta K_3$ of the second grating 12, which can be equivalent to $P_1^* \sin \theta_{12} = P_3^* \sin \theta_{34}$, and the second vector direction $u_2$ of the first grating 11 and the fourth vector direction $u_4$ of the second grating 12 are provided on the same straight line. On the basis of meeting this condition, any one of the following three examples must also be satisfied.

In some examples of the present application, referring to FIG. 18, the light guide device satisfies the following relationship: $|K_0 + \Delta K_{IC} \pm \Delta K_2| > (2\pi/\lambda)^* n_2$;

$K_0$ is the vector information of the incident light, $K_0 = (2\pi/\lambda) u_0$, $\lambda$ is the wavelength of the incident light, $u_0$ is the incident direction; $\Delta K_{IC}$ is the grating vector information of the second diffraction structure; $\Delta K_2$ is the second vector information of the first grating (i.e., the grating vector information of the short period), which includes the second vector direction $u_2$ and the second period $P_2$; $n_2$ is the refractive index of the substrate.

In some examples of the present application, the light guide device satisfies the following relationship: $|K_0 + \Delta K_{IC} + 4K_4 \pm \Delta K_2| > (2\pi/\lambda)^* n_2$;

$K_0$ is the vector information of the incident light, $K_0 = (2\pi/\lambda) u_0$, $\lambda$ is the wavelength of the incident light, $u_0$ is the incident direction; $\Delta K_{IC}$ is the grating vector information of the second diffraction structure; $\Delta K_4$ is the fourth vector information of the second grating, including the fourth vector direction $u_4$ and the fourth period $P_4$; $\Delta K_2$ is the second vector information of the first grating, including the second vector direction $u_2$ and the second period $P_2$; $n_2$ is the refractive index of the substrate.

In some examples of the present application, the light guide device satisfies the following condition: $|K_0 + \Delta K_{IC} + \Delta K_3 \pm \Delta K_2| > (2\pi/\lambda)^* n_2$;

K0 is the vector information of the incident light, $K_0 = (2\pi/\lambda) u_0$, $\lambda$ is the wavelength of the incident light, $u_0$ is the incident direction; $\Delta K_{IC}$ is the grating vector information of the second diffraction structure; $\Delta K_3$ is the third vector information of the second grating, including the third vector direction $u_3$ and the third period $P_3$; $\Delta K_2$ is the second vector information of the first grating, including the second vector direction $u_2$ and the second period $P_2$; $n_2$ is the refractive index of the substrate.

In an embodiment of the present application, the first grating 11 is configured with a much lower diffraction efficiency in the second vector direction $u_2$ than in the first vector direction $u_1$.

It should be noted that, on the premise of meeting the basic conditions, if none of the above three examples can be satisfied, the diffraction efficiency of the first grating 11 in the second vector direction can also be suppressed to a lower value, which can achieve the modulation effect of uniformity and transmittance with a weaker negative impact on other optical performances. Specifically, the lower diffraction efficiency of the first grating 11 in the second vector direction can be achieved by changing certain parameters.

In some examples of the present application, the first grating unit 111 includes one or a plurality of sub-gratings.

In the embodiments of the present application, as shown in FIG. 4, FIG. 6, FIG. 8, FIG. 10, FIG. 12, FIG. 14, and FIG. 16, the first grating unit 111 includes one or a plurality of sub-gratings, which means that each first grating unit 111 is not limited to a single shape but can be composed of two or a plurality of sub-gratings with different shapes.

By combining sub-gratings of different shapes and sizes, as shown in FIG. 10, a variety of different optical effects can be designed. This makes the grating more flexible and adaptable to various application scenarios, allowing for adjustment and optimization of grating performance based on actual needs.

When the first grating unit 111 includes the plurality of different sub-gratings with independent diffraction characteristics, their combination can precisely control the diffraction efficiency of the grating in different directions. This helps to achieve more complex diffraction patterns and meet specific optical requirements.

In some cases, manufacturing a single large grating with a complex shape may face significant technical challenges. By decomposing the large grating into a plurality of simpler sub-gratings, the manufacturing difficulty can be reduced, and the production efficiency and yield can be improved.

For light of different wavelengths or polarization states, different sub-gratings may have different response characteristics. By combining a plurality of sub-gratings, the grating can be provided with the good adaptability to a variety of light conditions, thereby broadening the application range of the grating.

In the light guide device provided in the present application, there is no limitation on the shape of the first grating unit 111 within the first grating 11. It can be any shape, any polygon with any rotation angle, or even any single curved shape, or a combination of a plurality of polygons or curved shapes, as shown in FIG. 4, FIG. 6, FIG. 8, FIG. 10, FIG. 12, FIG. 14, and FIG. 16.

According to an embodiment of the present application, an optical display system is provided, which includes: the light guide device and a light engine configured to project light onto the light guide device.

An embodiment of the present application provides an optical display system, which mainly consists of two parts: one is the light guide device described in all the above embodiments, and the other is an external light engine. These two parts work together to achieve efficient and high-quality light processing and projection functions.

The light guide device, as the core part of the optical system, is configured for effectively guiding and distributing the incident light.

The light engine is another important component of the optical system, the main function of which is to project light onto the light guide device, and providing a stable and high-quality light source for the light guide device.

According to an embodiment of the present application, a display device is provided, which includes: a housing and the optical system provided within the housing.

The specific implementation methods of the optical display system and the display device according to the embodiments in the present application can refer to the various embodiments of the light guide device described above, and therefore have all the beneficial effects brought by the technical solutions of the above embodiments, which will not be repeated here.

The focus of the above embodiments is on the differences between each embodiment. As long as the different optimization features between the embodiments do not conflict, they can be combined to form a more optimal embodiment. For the sake of brevity, this will not be elaborated here.

Although the application has been described in detail with specific embodiments, those skilled in the art should understand that these embodiments are provided for illustration purposes only and are not intended to limit the scope of the present application. Those skilled in the art should understand that the embodiments can be modified without departing from the scope and spirit of the application. The scope of the present application is defined by the appended claims.

What is claimed is:

1. A light guide device, comprising a substrate and a first diffraction structure provided at the substrate, wherein:
    the first diffraction structure comprises a first grating;
    the first grating comprises a plurality of first grating units provided at intervals of a first period $P_1$ along a first vector direction $u_1$ and at intervals of a second period $P_2$ along a second vector direction $u_2$;
    the first vector direction $u_1$ is intersected with the second vector direction $u_2$, the first period $P_1$ is longer than the second period $P_2$, forming unequal periods in two vector directions, and the first period $P_1$ is at least 1.5 times the second period $P_2$;
    the light guide device further comprises a second diffraction structure provided at the substrate;
    the second diffraction structure is configured for coupling incident light into the substrate;
    the substrate is configured for totally reflecting the incident light from the second diffraction structure to the first diffraction structure;
    the first diffraction structure is configured for coupling out light and is composed of the first grating, and the first grating is an improved one-dimensional grating with a period of P and a vector direction of u;
    the first grating satisfies:

$$\frac{2\pi}{P_{IC}} u_{IC} + \frac{2\pi}{P} u + \frac{2\pi}{P_2} u_2 = 0;$$

and
    $P_{IC}$ is a grating period of the second diffraction structure, $u_{IC}$ is a vector direction of the second diffraction structure, and $P_{IC}$ and $u_{IC}$ constitute grating vector information of the second diffraction structure.

2. An optical display system, comprising:
    the light guide device according to claim 1; and
    an optical machine configured for projecting light onto the light guide device.

3. A display device, comprising:
    a housing; and
    the optical display system according to claim 2, wherein the optical display system is provided in the housing.

4. The light guide device according to claim 1, wherein the first diffraction structure further comprises a second grating, and the second grating comprises a plurality of second grating units;
    the plurality of second grating units are provided at intervals of a third period $P_3$ along a third vector direction $u_3$ and at intervals of a fourth period $P_4$ along a fourth vector direction $u_4$, and the third vector direction $u_3$ is intersected with the fourth vector direction $u_4$;
    the first grating is combined with the second grating in a set manner; and
    the first vector direction $u_1$ is same as the third vector direction $u_3$, the first period $P_1$ is same as the third period $P_3$, and the second vector direction $u_2$ and the fourth vector direction $u_4$ are on a same line.

5. The light guide device according to claim 4, wherein the light guide device satisfies: $|K_0+\Delta K_{IC}+\Delta K_4\pm\Delta K_2|>(2\pi/\lambda)*n_2$;
    $K_0$ is vector information of the incident light, $K_0=(2\pi/\lambda)u_0$, $\lambda$ is a wavelength of the incident light, and $u_0$ is an incident direction;
    $\Delta K_{IC}$ is the grating vector information of the second diffraction structure;
    $\Delta K_4$ is fourth vector information of the second grating and comprises the fourth vector direction $u_4$ and the fourth period $P_4$;
    $\Delta K_2$ is second vector information of the first grating and comprises the second vector direction $u_2$ and the second period $P_2$; and
    $n_2$ is a refractive index of the substrate.

6. The light guide device according to claim 4, wherein the light guide device satisfies: $|K_0+\Delta K_{IC}+\Delta K_3\pm\Delta K_2|>(2\pi/\lambda)*n_2$;
    $K_0$ is vector information of the incident light, $K_0=(2\pi/\lambda)u_0$, $\lambda$ is a wavelength of the incident light, $u_0$ is an incident direction;
    $\Delta K_{IC}$ is the grating vector information of the second diffraction structure;
    $\Delta K_3$ is third vector information of the second grating and comprises the third vector direction $u_3$ and the third period $P_3$;
    $\Delta K_2$ is second vector information of the first grating and comprises the second vector direction $u_2$ and the second period $P_2$; and
    $n_2$ is a refractive index of the substrate.

7. The light guide device according to claim 1, wherein the first grating unit comprises one or more sub-gratings.

8. The light guide device according to claim 1, wherein the light guide device satisfies: $|K_0+\Delta K_{IC}\pm\Delta K_2|>(2\pi/\lambda)*n_2$;
    $K_0$ is vector information of the incident light, $K_0=(2\pi/\lambda)u_0$, $\lambda$ is a wavelength of the incident light, and $u_0$ is an incident direction;
    $\Delta K_{IC}$ is the grating vector information of the second diffraction structure;
    $\Delta K_2$ is second vector information of the first grating and comprises the second vector direction $u_2$ and the second period $P_2$; and
    $n_2$ is a refractive index of the substrate.

* * * * *